United States Patent [19]
Varanasi

[11] Patent Number: 5,790,571
[45] Date of Patent: Aug. 4, 1998

[54] CODING DATA IN A DISC DRIVE ACCORDING TO A CODE HAVING DESIRED ALGEBRAIC CHARACTERISTICS

[75] Inventor: Chandra C. Varanasi, Simi Valley, Calif.

[73] Assignee: Seagate Technology, Inc., Scotts Valley, Calif.

[21] Appl. No.: 568,879

[22] Filed: Dec. 11, 1995

[51] Int. Cl.$^6$ ................................................ G11C 29/00
[52] U.S. Cl. ..................................... 371/40.12; 371/43.1
[58] Field of Search .............................. 371/43, 40.12; 341/58, 59, 81

[56] References Cited

U.S. PATENT DOCUMENTS

| | | | |
|---|---|---|---|
| 4,609,607 | 9/1986 | Adler et al. | 341/59 |
| 4,707,681 | 11/1987 | Eggenberger et al. | 341/59 |
| 4,786,890 | 11/1988 | Marcus et al. | 341/81 |
| 4,870,414 | 9/1989 | Karabed et al. | 341/57 |
| 4,888,779 | 12/1989 | Karabed et al. | 371/43 |
| 5,257,272 | 10/1993 | Fredrickson | 371/43 |
| 5,635,933 | 6/1997 | Fitzpatrick et al. | 341/58 |

OTHER PUBLICATIONS

Comsig 88, Pretoria, "A Computer Search For Convolutional Codes With Good Distance Profiles", IEEE, pp. 148–152, 1988.

David, "Determination of Progression Steps in Lattice Planning Method", IEEE, pp. 307–313, Sep. 1989.

"Matched Spectral–Null Codes for Partial–Response Channels" by Razmik Karabed and Paul H. Siegel, *IEEE Transactions on Information Theory*, vol. 37, No. 3, May 1991, pp. 818–855.

*Primary Examiner*—Reba I. Elmore
*Assistant Examiner*—McDieunel Marc
*Attorney, Agent, or Firm*—Westman, Champlin & Kelly, P.A.

[57] ABSTRACT

The present invention involves a method to transmit data over a communication channel that can be modelled as one of the three following partial response channels: dicode channel, PR4 channel and EPR4 channel. The method includes choosing a code, based on its algebraic structure, to obtain a desired minimum distance for the coded channel. A data sequence to be written to the storage medium is received and encoded according to the chosen code, to obtain encoded data. The encoded data is written to the storage medium.

12 Claims, 2 Drawing Sheets

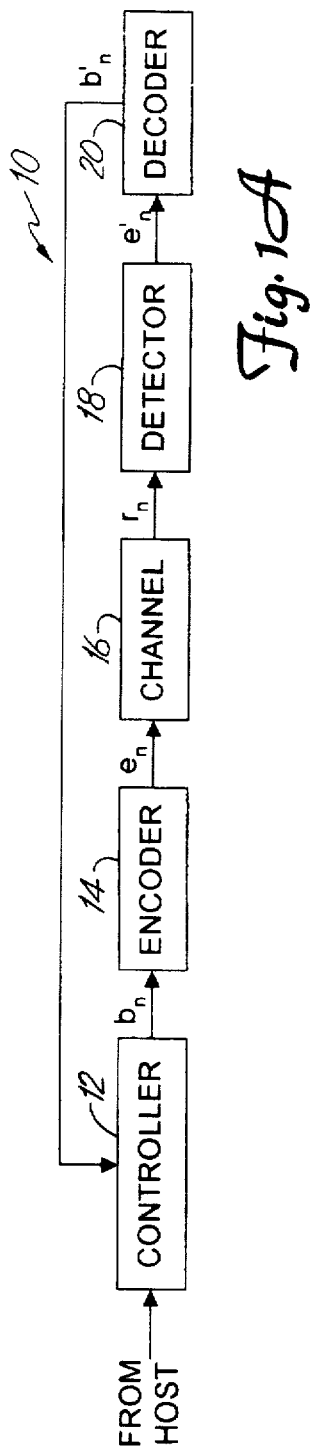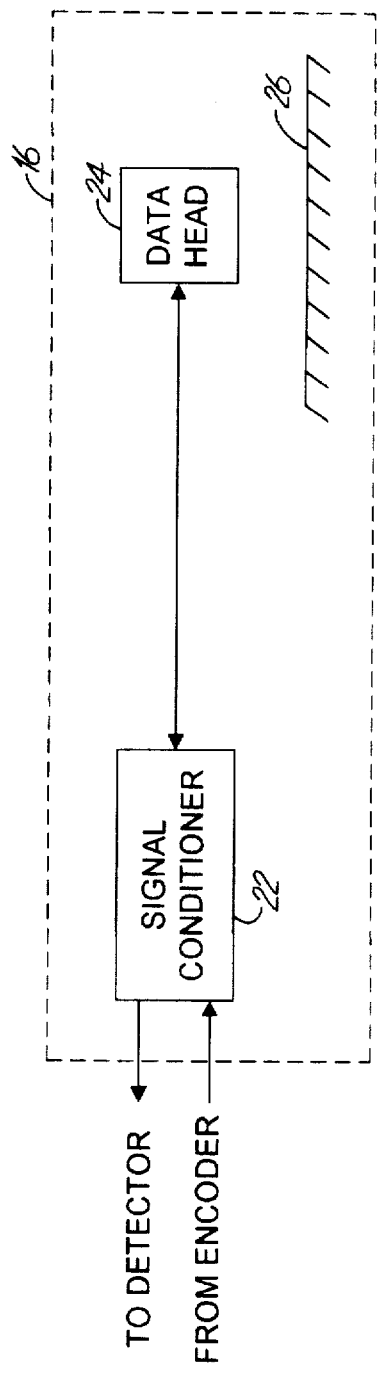

CODING DATA IN A DISC DRIVE ACCORDING TO A CODE HAVING DESIRED ALGEBRAIC CHARACTERISTICS

BACKGROUND OF THE INVENTION

The present invention deals with transmission of encoded data over a communication channel. More specifically, the present invention deals with transmitting information to and from a disc in a disc drive.

A typical disc drive includes one or more magnetic discs mounted for rotation on a hub or spindle. A typical disc drive also includes a transducer supported by a hydrodynamic air bearing which flies above each magnetic disc. The transducer and the hydrodynamic air bearing are collectively referred to as a data head. A drive controller is conventionally used for controlling the disc drive based on commands received from a host system. The drive controller controls the disc drive to retrieve information from the magnetic discs and to store information on the magnetic discs.

An electromechanical actuator operates within a negative feedback, closed-loop servo system. The actuator moves the data head radially over the disc surface for track seek operations and holds the transducer directly over a track on the disc surface for track following operations.

Customer information is typically stored in concentric tracks on the surface of magnetic discs by providing a write signal to the data head which affects the orientation of magnetization on the surface of the magnetic disc. The write current signal is representative of the data pattern to be stored on the disc. In retrieving data from the disc, the controller controls the electromechanical actuator so that the data head flies above the magnetic disc, sensing the flux reversals on the magnetic disc, and generating a read signal based on those flux reversals. The read signal is processed and the data represented by the magnetic flux pattern is recovered, and sent back to the customer via the controller.

More specifically, a conventional disc drive includes an encoder which receives from the controller an input data stream to be stored on the magnetic disc. The encoder encodes the data into code words and provides the code words to conditioning logic, the data head, and the magnetic disc, all of which are collectively referred to as a channel. The code words are written as flux reversals on the surface of the disc. In reading the information, the flux reversals are read and provided to a data detector which detects the flux reversals and, hence, the data on the disc. The detector may be a Viterbi-type detector or other sequence estimator for estimating the sequence being retrieved from the disc. The estimated sequence is then provided to a decoder which decodes the data and provides it to the disc drive controller.

In reading data from the disc, the data pulses received from the disc are often corrupted by noise. Therefore, it is the job of the detector to estimate the actual code word which was written on the disc based on the code word read from the disc and based on other possible code words which could have been read from the disc.

The similarity between any two code words to be stored to the disc is representable by Euclidian distance between them. The minimum distance between any two code words transmitted over a channel is referred to as the free distance of the channel. The free-distance is indicative of the performance of the channel. The larger the free distance of any particular channel, the less likely it will be that the detector will mistake one codeword for another. Thus, the detector will be less likely to detect an erroneous code word. Therefore, it is desirable to increase the free distance of any given channel in a data storage system in order to improve drive performance.

Until now, efforts to increase the free distance of a channel have been directed toward analyzing the power spectrum of the channel. For example, one coding technique known as matched-spectral-null (MSN) coding codes data sequences such that the power spectrum of the encoded data exhibits nulls at the same frequency at which the channel's power spectrum has a dominant null. Such a technique has been found to double the free-distance of dicode channel and a PR4 channel, and increase the free-distance of an EPR4 channel by 50%. Such a system is set out in U.S. Pat. No. 4,888,779 which issued Dec. 19, 1989. For instance, a code known as the biphase code, and another code known as the interleaved biphase code are MSN codes for some PR channels. The biphase code triples the free distance of the dicode channel; the interleaved biphase code triples the free distance of the PR4 channel, and triples the free distance of the EPR4 channel.

Such efforts, which concentrate on the power spectrum of the channel, have not been effective in generating vast numbers of codes to choose from. It is difficult to locate such codes. Also, because the MSN approach requires that half the bits in a codeword be 1's and half be 0's to generate a dc-null code, the encoding rate m/n of MSN codes require the denominator to be an even number; if the code is to be a block code. That is, the denominator must be even if the finite state machine representative of the encoder is to contain only one state.

SUMMARY OF THE INVENTION

The present invention contravenes conventional wisdom by not concentrating on the power spectrum of the channel, but rather concentrating on the algebraic characteristics of the code. The present invention is based (in part) on the realization that the coefficient values in the difference event of a code (and not the power spectrum associated with the code) contribute to the free distance of the channel used with the code. Therefore, by choosing a code based on the coefficients of difference events corresponding to the code, one can increase free distance. Encoding data according to the chosen code thus enhances performance of the drive. The power spectrum of the channel is completely irrelevant to this performance enhancing technique.

Thus, the present invention involves a method to store data on a storage medium. The method includes choosing a code, based on its algebraic structure, to obtain desired performance. A data sequence to be written to the storage medium is received and encoded according to the chosen code, to obtain encoded data. The encoded data is written to the storage medium.

BRIEF DESCRIPTION OF THE DRAWINGS

FIG. 1A is a block diagram of a portion of a disc drive according to the present invention.

FIG. 1B is a more detailed block diagram of a channel according to the present invention.

DETAILED DESCRIPTION OF THE PREFERRED EMBODIMENTS

Figure 2:
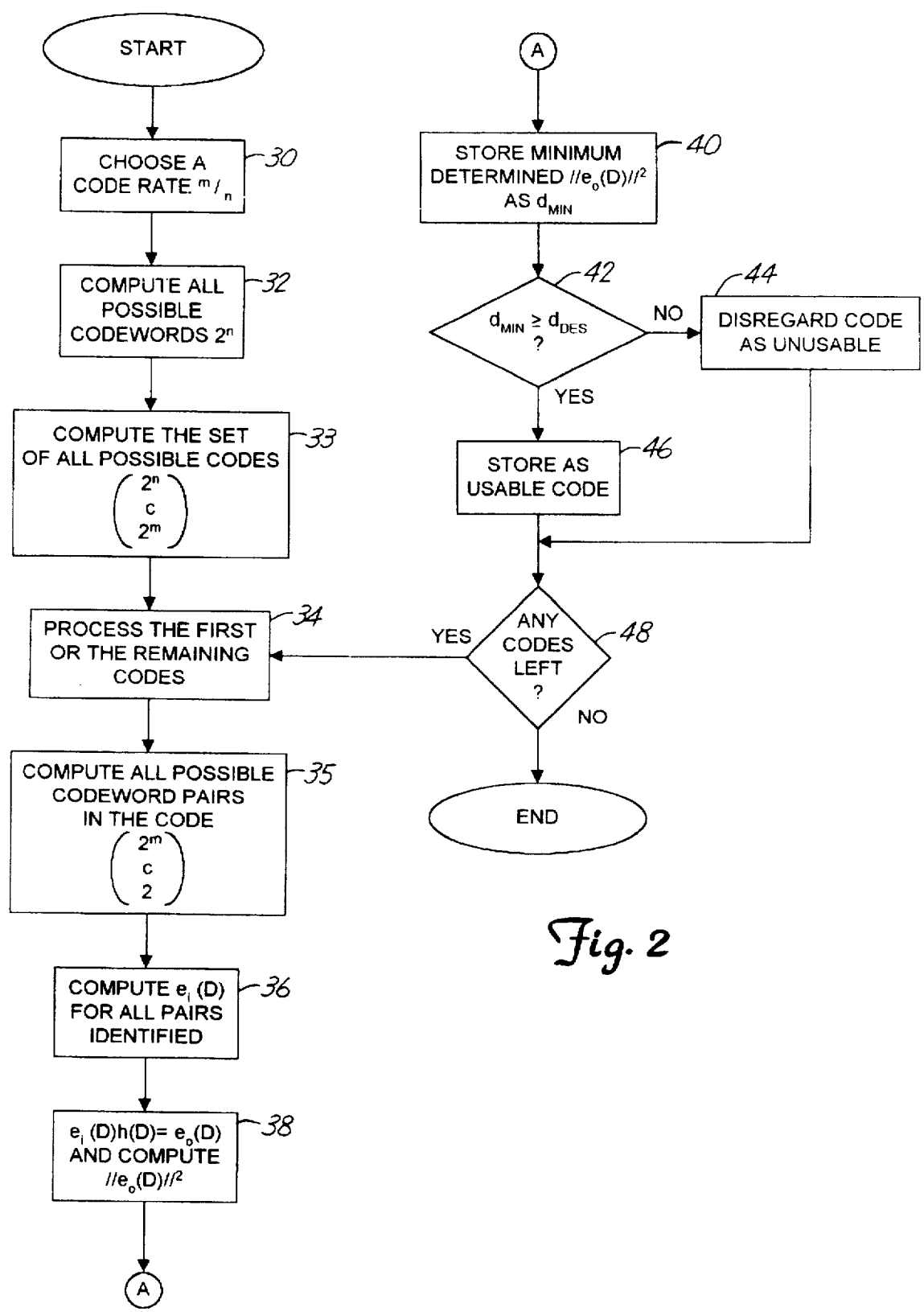
FIG. 2 is a flow diagram illustrating how codes are determined according to the present invention.

FIG. 1A is a block diagram of a portion of a disc drive system 10 according to the present invention. Disc drive system 10 includes controller 12, encoder 14, channel 16, detector 18 and decoder 20. FIG. 1B is a more detailed diagram of channel 16. In the present embodiment, channel 16 includes a signal conditioner 22, data head 24 and magnetic disc 26. In a preferred embodiment, signal conditioner 22 includes amplification and filtering circuitry, and other suitable signal conditioning circuitry.

Controller 12, in the preferred embodiment, is a drive controller which typically receives either data to be stored to the disc drive system, or receives a request to retrieve data from the disc drive system. Such information is typically received from a host system, not shown. In response to a request from the host system to write information to the disc drive, controller 12 provides a data symbol sequence $\{b_n\}$ that is to be encoded and stored on the surface of disc 26.

The data in sequence $\{b_n\}$ is encoded at encoder 14 into an encoded sequence $\{e_n\}$. The bits in the encoded sequence $\{e_n\}$ are transmitted at regular time intervals over channel 16. Specifically, the bits are transmitted to signal conditioner 22 and data head 24 and are encoded on the surface of disc 26 as flux reversals. In reading information from disc 26, data head 24 is positioned over a desired track on disc 26 and provides an output signal to signal conditioner 22 indicative of the flux reversals previously encoded on disc 26. In the process of writing the data to disc 26 and reading the data from disc 26, the signal indicative of that data is likely to be corrupted by extraneous noise in channel 16. Therefore, the data sequence recovered from channel 16, $\{r_n\}$, is typically not an exact replica of the encoded data $\{e_n\}$ provided to channel 16. Detector 18 makes a best estimate of $\{e_n\}$ based on $\{r_n\}$, and provides that estimate as $\{e'_n\}$. Finally, decoder 20 recovers a data sequence $\{b'_n\}$ based on $\{e'_n\}$ and provides that sequence to controller 12.

This process of writing data to disc 26 and reading data from disc 26 can be modeled as a communication system. In such a model, the process of storing data on disc 26 is viewed as transmitting data over a communication channel, and the process of retrieving data previously stored on disc 26 is viewed as receiving data which has been transmitted over the communication channel.

The channel portion of such a data storage system is typically modeled as a partial response (PR) communication channel. The defining characteristic of a PR channel is that its response to a bit transmitted over it in the current time interval depends not only that bit, but also on bits transmitted over it in previous time intervals.

There are three conventional types of PR channel models found in magnetic recording applications. Those models include a dicode channel, a partial response class 4 (PR4) channel, and an extended partial response class 4 (EPR4) channel. The channels are mathematically represented by their transfer functions h(D). The transfer functions of the PR channels mentioned above are given by the following three equations:

the dicode channel:

$$h(D)=1-D \quad \text{Equation 1}$$

the PR4 channel:

$$h(D)=1-D^2 \quad \text{Equation 2}$$

the EPR4 channel:

$$h(D)=1+D-D^2-D^3. \quad \text{Equation 3}$$

From the above equations, it is seen that the dicode channel's response to a bit transmitted in the current time interval depends on the bit transmitted in the immediately preceeding time interval also. The PR4 channel's response to the bit in the current time interval depends on the bit transmitted two time intervals ago. The EPR4 channel's response to the bit transmitted in the current time interval depends on the bits transmitted in the previous three time intervals.

The notation given in Equations 1–3 is known. The "1" at the beginning of each equation indicates the current bit. The exponent power of the other "D" terms in the equations represents the number of places removed (previously in time) from the present bit. For example, if the sequence of bits 1101 is transmitted over the above PR channels, the response of each of those channels to the fourth bit is as follows:

dicode channel: 1−0=1

PR4 channel: 1−1=0

EPR4 channel: 1+0−1−1=−1

Therefore, it can be seen that, any given bit sequence can be represented as a polynomial in D with the bits forming the coefficients of the polynomial. Thus, given the sequence 1101, its polynomial representation is $1+D+D^3$.

In order to further clarify the notation, let $e_1$ and $e_2$ be two finite-length sequences that are input into a PR channel, and let $r_1$ and $r_2$ be the corresponding output sequences. That is:

$$r_1(D)=e_1(D)h(D) \quad \text{Equation 4}$$

and $$r_2(D)=e_2(D)h(D) \quad \text{Equation 5}$$

The sequence $r_1-r_2$ is referred to as the error sequence. Also, $r_1(D)-r_2(D)$ is referred to as the output error polynomial $e_0(D)$. The sum of the squares of the coefficients of the terms in $e_0(D)$ is referred to as the squared Euclidean distance between the two output sequences $r_1$ and $r_2$ and is denoted by $d^2$.

For example, let $e_1=100101$ and $e_2=001101$. Let these two sequences be input to the dicode channel. Then, $e_1(D)=1+D^3+D^5$ and $e_2(D)=D^2+D^3+D^5$, and from Equations 4 and 5 above:

$$r_1(D)=(1+D^3+D^5)(1-D) \quad \text{Equation 6}$$

$$=1-D+D^3-D^4+D^5-D^6 \quad \text{Equation 7}$$

Further, $$r_2(D)=(D^2+D^3+D^5)(1-D) \quad \text{Equation 8}$$

$$=D^2-D^4+D^5-D^6 \quad \text{Equation 9}$$

Therefore, $$e_0(D)=1-D-D^2+D^3 \quad \text{Equation 10}$$

Thus, the squared Euclidian distance between $r_1$ and $r_2$ is:

$$d^2=1+1+1+1=4 \quad \text{Equation 11}$$

The Euclidian distance between a pair of sequences at the output of channel 16 is indicative of how similar those two sequences are. The higher the value of $d^2$, the further apart are the sequences, and thus the less similar. Every pair of output sequences generates a certain value for distance between the members of that pair. The smallest possible value of distance is referred to as the free distance or minimum distance of the channel. Therefore, the higher the free distance of a channel the better will be the channel performance. The free distance (without use of encoding) of the dicode channel, the PR4 channel and the EPR4 channel are known, and they are 2, 2 and 4, respectively. Therefore, any two codewords in the code, subtracted from one another, and multiplied by the transfer function polynomial of the channel, will never give a value less than 2 for the dicode channel, 2 for the PR4 channel and 4 for the EPR4 channel.

As described above, due to noise, detector 18 sometimes determines that a sequence, other than the actually transmitted sequence, was transmitted. A transmitted sequence is usually confused with a sequence that is closest to it in terms of Euclidian distance. Therefore, the present invention uses a code which enhances the free distance of the channel and thus improves the performance of the communication system when it is operating in a noisy environment. Encoder 14 encodes the data sequences $\{b_n\}$ using a code which yields an increase in the free distance of the channel.

Rather than analyzing the power spectrum of the channel, as taught by conventional wisdom, the present invention realizes that the algebraic structure inherent in the codes used by encoder 14 yields the free distance enhancing property.

This can be demonstrated as follows. Assume a block code C is implemented in encoder 14 in FIG. 1A. A rate m/n block code splits the data sequence $\{b_n\}$ into blocks of length m bits, encodes each block of length m into a codeword of length n bits, and then concatenates all those n-bit long codewords to form the sequence $\{e_n\}$. Let a difference event $e_i(D)$ between two codeword polynomials $e_1(D)$ and $e_2(D)$ be $e_1(D)$ minus $e_2(D)$.

$$e_i(D)=1+a_1D+a_2D^2+\ldots+a_{n-1}D^{n-1}+a_nD^n \quad \text{Equation 12}$$

where, for $1 \leq i \leq n$, $a_i \in [1, 0, -1]$. This is simply the polynomial obtained by subtracting one codeword from the other. Subtraction should begin at the point at which the two codewords first differ, as the codewords are read from left to right. The values obtained by the subtraction are the coefficients $a_i$ in the polynomial.

For example, consider a block code that has the following two as codewords, among others.

Codeword 1: 10111010
Codeword 2: 10001001

The difference event between the two codewords is:

$$a_i(D)=1+D+D^4-D^5 \quad \text{Equation 13}$$

For a channel having a transfer function h(D), let $e_0(D)$ denote an error event generated by a difference event $e_i(D)$ at the output of h(D). Then, $$e_0(D)=e_i(D)h(D) \quad \text{Equation 14}$$

Now considering the three different channel models, first the dicode channel:

For a given $e_i(D)$, $$e_0(D) = \left( \sum_{i=0}^{n} a_iD^i \right) [1-D] \quad \text{Equation 15}$$

where $a_o=1$ by definition and $a_n=\pm 1$ $$= 1 + \left( \sum_{i=1}^{n} (a_i - a_{i-1})D^i \right) - a_nD^{n+1} \quad \text{Equation 16}$$

Therefore, the squared norm of the error event is as follows:

$$\|e_0(D)\|^2 = 1 + \left( \sum_{i=1}^{n} (a_i - a_{i-1})^2 \right) + a_n^2 \quad \text{Equation 17}$$

$$= 2 + \sum_{i=1}^{n} (a_i - a_{i-1})^2$$

Therefore, the minimum squared distance for the dicode channel is at least 2, and when n=0, that lower bound is reached.

Now examine the dicode channel where $n \geq 1$. The squared norm of the error event is as follows:

$$\|e_0(D)\|^2 = 2 + (a_1 - 1)^2 + \sum_{i=2}^{n} (a_i - a_{i-1})^2 \quad \text{Equation 18}$$

If $a_1=-1$, then the right side of Equation 18 is at least 6. Therefore, a code in which for every difference event $a_1=-1$ the code at least triples the minimum distance of the dicode channel.

As another example, where $n \geq 2$, the squared norm of the error event is as follows:

$$\|e_0(D)\|^2 = 2 + (a_1 - 1)^2 + (a_2 - a_1)^2 + \sum_{i=3}^{n} (a_i - a_{i-1})^2 \quad \text{Equation 19}$$

Letting $a_2=-1$, the above Equation yields:

$$\|e_0(D)\|^2 = 2 + (a_1 - 1)^2 + (a_1 + 1)^2 + \sum_{i=3}^{n} (a_i - a_{i-1})^2 \quad \text{Equation 20}$$

$$= 4 + 2a_1^2 + \sum_{i=3}^{n} (a_i - a_{i-1})^2 \quad \text{Equation 21}$$

Thus, for every code in which, for every difference event, $a_2=-1$, that code at least doubles the free distance of the dicode channel.

For the PR4 channel, the transfer function is given by:

$$h(D)=1-D^2 \quad \text{Equation 22}$$

The error event is given by:

$$e_0(D) = \left( \sum_{i=0}^{n} a_iD^i \right)(1-D^2) \quad \text{Equation 23}$$

$$= 1 + \left( \sum_{i=1}^{n} (a_i - a_{i-2})D^i - a_{n-1}D^{n+1} - a_nD^{n+2} \right) \quad \text{Equation 24}$$

The squared norm of the error event is given by:

$$\|e_0(D)\|^2 = 1 + \left( \sum_{i=1}^{n} (a_i - a_{i-2})^2 \right) + a_{n-1}^2 + a_n^2 \quad \text{Equation 25}$$

$$= 2 + \left( \sum_{i=1}^{n} (a_i - a_{i-2})^2 \right) + a_{n-1}^2 \quad \text{Equation 26}$$

Therefore, the minimum free distance of the PR4 channel is at least two. When n=0, that lower bound is reached.

Note that, if n=1, the right side of the above Equation yields a value of 4. This exactly doubles the free distance of the PR4 channel.

As another example, let $n \geq 2$ in Equation 26, with $a_2=-1$. Then, the squared norm of the error event is as follows:

$$\|e_0(D)\|^2 = 6 + a_1^2 + \left( \sum_{i=3}^{n} (a_i - a_{i-2})^2 \right) + a_{n-1}^2 \qquad \text{Equation 27}$$

A code having the above characteristics triples the free distance of the PR4 channel.

For the EPR4 channel, the transfer function is given by:

$$h(D) = 1 + D - D^2 - D^3 \qquad \text{Equation 28}$$

The error event is given by:

$$\begin{aligned} e_0(D) &= \left( \sum_{i=0}^{n} a_i D^i \right)(1 + D - D^2 - D^3) & \text{Equation 29} \\ &= \left( \sum_{i=0}^{n} a_i D^i \right) + \left( \sum_{i=0}^{n} a_i D^{i+1} \right) - & \text{Equation 30} \\ & \quad \left( \sum_{i=0}^{n} a_i D^{i+2} \right) - \left( \sum_{i=0}^{n} a_i D^{i+3} \right) \\ &= 1 + \left( \sum_{i=1}^{n} (a_i + a_{i-1} - a_{i-2} - a_{i-3}) D^i \right) + & \text{Equation 31} \\ & \quad (a_n - a_{n-1} - a_{n-2}) D^{n+1} - (a_n + a_{n-1}) D^{n+2} - a_n D^{n+3} \end{aligned}$$

Therefore, the squared norm of the error event is given by:

$$\begin{aligned} \|e_0(D) \times \|^2 &= 1 + \left( \sum_{i=1}^{n} (a_i - a_{i-1} - a_{i-2} - a_{i-3})^2 \right) + & \text{Equation 32} \\ & \quad (a_n - a_{n-1} - a_{n-2})^2 + (a_n + a_{n-1})^2 + a_n^2 \\ &= 2 + \left( \sum_{i=1}^{n} (a_i + a_{i-1} - a_{i-2} - a_{i-3}) \right)^2 + & \text{Equation 33} \\ & \quad (a_n - a_{n-1} - a_{n-2})^2 + (a_n + a_{n-1})^2 \end{aligned}$$

As an example, the right side of Equation 33 is analyzed below for three different cases: n=0, n=1 and n>1.

For n=0, the case is simple and the right side of Equation 33 is 4.

For n=1, the right side of Equation 33 becomes:

$$2 + (a_1 + 1)^2 + (a_1 - 1)^2 + (a_1 + 1)^2 = 8 + 2a_1 \qquad \text{Equation 34}$$

The value of the above equation is 6 if $a_1 = -1$ and 10 if $a_1 = 1$.

In the case where n>1, the right side of Equation 33 becomes:

$$2 + (a_1 + 1)^2 + (a_2 + a_1 - 1)^2 + (a_n - a_{n-1} - a_{n-2})^2 + \qquad \text{Equation 35}$$

$$(a_n + a_{n-1})^2 + \sum_{i=3}^{n} (a_i + a_{i-1} - a_{i-2} - a_{i-3})^2$$

Assuming $a_n = \pm 1$, it can be verified that for any combination of $a_1$, $a_2$, $a_{n-2}$, $a_{n-1}$ and $a_n$, the first five terms of the above summation sum to a value of at least 4. This leads to the conclusion that the minimum squared distance for the EPR4 channel is 4.

It can readily be seen that the right of Equation 33 yields value of 6 when $a_1 = -1$. Hence, any code having this characteristic increases the free distance of the EPR4 channel by 50%.

As another example, examine the right side of Equation 33 when n=3 and $a_2 = -1$. This yields:

$$2 + (a_1 + 1)^2 + (a_1 - 2)^2 + (a_3 + 1 - a_1)^2 + (a_3 - 1)^2 + (a_3 - a_1 - 2)^2 = 16 + 4a_1^2 - 4a_3(a_1 + 1) \qquad \text{Equation 37}$$

The above expression yields a value of at least 12 for any value of $a_1$ subject to the condition that $a_3 = \pm 1$. Also, consider the right side of Equation 33 when n=2 and $a_2 = -1$. This provides:

$$2 + (a_1 + 1)^2 + (a_1 - 2)^2 + (a_1 + 2)^2 + (a_1 - 1)^2 = 12 + 4a_1^2 \qquad \text{Equation 38}$$

For any value of $a_1$, the above Equation yields a value of at least 12.

Therefore, based on the understanding that it is not the spectral null property that makes a code increase the minimum distance of the channels in which it is used, but rather an algebraic structure inherent in such codes, an exhaustive computer search has been performed to discover codes that double the squared minimum distance of the dicode channel, codes that double the squared minimum distance of the PR4 channel, and codes that increase the squared minimum distance of the EPR4 channel by 50%. The codes are attached as Table 1, for the dicode channel, Table 2 for the PR4 channel, and Table 3 for the EPR4 channel. All of the codes in Tables 1–3 have a rate of 3/5 and are provided in decimal rotation.

While the Tables 1–3 show codes having a rate of 3/5, and while these codes enhance the free distance of the channels, any rate can be chosen, and a computer search as per the flow diagram of FIG. 2 can be done to see if a free-distance enhancing code of that rate exists.

The process for determining the code is similar, only the desired performance enhancement changes, and the transfer function of the channel must change to reflect the channel model being used. The steps in the process of determining the code are set out in the flow diagram shown in FIG. 2.

First, as shown in block 30, the particular rate, m/n must be determined.

Then, the number of all possible codewords ($2^n$) is computed and $2^m$ of those codewords are chosen. This is indicated by blocks 32 and 33. Each such set of $2^m$ codewords forms a code. All those codes are examined, starting with the first code in that collection. This is indicated by block number "34".

Next, for each of the codes chosen, all possible pairs of its codewords are defined. This is indicated in block 35.

The difference event for each of the pairs defined in block 34 is then computed. This is indicated by block 36.

The difference event generated in block 36 is multiplied by the transfer function of the channel model being used. The coefficients of the D terms in the resulting polynomial are each squared and then summed. This is the distance value generated by that particular difference event. This is indicated by block 38.

The minimum value of the various distances computed in block 38 is noted and this value represents the free distance of the channel implementing the chosen code. This is indicated by block 40.

The minimum distance computed in block 40 is then compared to a desired minimum distance value. if the minimum distance computed in block 40 is greater than or equal to the desired minimum distance value, then the code is acceptable and can be implemented in the encoder. Otherwise, the code is disregarded and another code is analyzed. This indicated by blocks 42, 44, 46 and 48.

The above steps can be repeated to obtain any desired minimum free distance, with any code rate, and further with any channel model. If a code with those desired properties exists, this procedure yields that code.

From the above, it can be seen that, contrary to conventional wisdom, the distance enhancing features of various codes are not dependent on the power spectrum of the channel. Instead, the distance enhancing features are dependent upon the coefficients of the D terms in the difference event polynomial.

The general description of the difference event polynomial is as follows:

$$\sum_{i=0}^{n} a_i D_i$$

For a given difference event, some of the $a_i$ terms will be 0, some will be 1 and some will be $-1$ in the resulting polynomial. Codes should be chosen such that their difference events have coefficients that yield whatever performance is desired. The performance of a channel is typically stated in terms of the minimum free distance of the channel utilizing the particular code. Thus, if one wishes to double or triple the minimum free distance of the channel, a desired code is simply chosen with characteristics that yield the doubling or tripling.

It can be seen that the present invention significantly enhances the performance of disc drive, thus enabling a greater amount of data to be written to the disc drive, without significantly increasing the complexity of the disc drive. The codes can be generated in a straight forward manner and implemented substantially using existing circuit technology.

Although the present invention has been described with reference to preferred embodiments, workers skilled in the art will recognize that changes may be made in form and detail without departing from the spirit and scope of the invention.

What is claimed is:

1. A method of storing data on a storage medium in a disc drive modeled as a channel having a transfer function, the method comprising:
   choosing a desired free channel distance;
   choosing a code;
   obtaining a difference event for pairs of codewords in the code;
   obtaining an error event for each difference event of the code equal to the difference event multiplied by the transfer function of the channel;
   obtaining a difference value for each difference event based on the error event;
   determining a minimum difference value for the code;
   comparing the minimum difference value with the desired free channel distance;
   if the minimum difference value meets the desired free channel distance:
      receiving a data sequence to be written to the storage medium;
      encoding the data sequence according to the chosen code to obtain encoded data; and
      writing the encoded data to the storage medium.

2. The method of claim 1 wherein the storage medium comprises a portion of the channel in the disc drive, and further comprising:
   if the minimum difference value does not meet the desired free channel distance, choosing other pairs of codewords so coefficient values in the difference event contribute to a minimum difference value of the channel that meets the desired free channel distance.

3. The method of claim 2 wherein the channel is modeled as a dicode channel and wherein choosing the code comprises:
   choosing the code so the coefficient values contribute to a free distance of at least 4 for the dicode channel.

4. The method of claim 2 wherein the channel is modeled as a partial response class 4 (PR4) channel and wherein choosing the code comprises:
   choosing the code so the coefficient values contribute to a free distance of at least 4 for the PR4 channel.

5. The method of claim 2 wherein the channel is modeled as an extended partial response class 4 (EPR4) channel and wherein choosing the code comprises:
   choosing the code so the coefficient values contribute to a free distance of at least 6 for the EPR4 channel.

6. The method of claim 1 wherein the storage medium comprises a portion of the channel in the disc drive, and wherein choosing a code comprises:
   determining a desired encoding rate (n/m) wherein n bits in the data sequence are encoded into m bits;
   determining a number x of all possible codewords as $2^m$;
   choosing a number, y, of codewords from the x codewords where $y=2^n$;
   defining all possible pairs for the y codewords; and
   wherein determining a difference event for each pair comprises:
      determining a distance between members of each pair.

7. The method of claim 6 and if the minimum difference value does not meet the desired free channel distance, further comprising:
   repeating the steps of choosing a number of codewords, defining all possible pairs, determining difference events, obtaining a difference value, determining a minimum difference value, and comparing, until the minimum difference value is at least as great as the desired free channel distance.

8. A disc drive, comprising:
   an encoder implementing code means for encoding an input data stream into codewords;
   a channel coupled to the encoder to receive and store the codewords;
   a detector coupled to the channel to detect codewords read from the channel; and
   a decoder coupled to the detector to receive the codewords from the detector and decode the codewords into data indicative of the input data stream;
   wherein the encoder implements a code obtained by choosing a desired free channel distance;
      choosing a code;
      obtaining a difference event for pairs of codewords in the code;
      obtaining an error event for each difference event of the code equal to the difference event multiplied by the transfer function of the channel;
      obtaining a difference value for each difference event based on the error event;
      determining a minimum difference value for the code;
      comparing the minimum difference value with the desired free channel distance;
      repeating the steps of obtaining an error event, obtaining a difference value, determining a minimum difference value and comparing until the minimum difference value meets the desired free channel distance.

9. The disc drive of claim 8 wherein the channel comprises:
   a magnetic disc arranged to receive the codewords for storage thereon; and
   a data head disposed relative to the magnetic disc to access the codewords on the magnetic disc.

10. The disc drive of claim 8 wherein the code means comprises:

a code having a rate n/m where n-bits of the input data stream are encoded into m-bit codewords, and wherein m is an odd number.

11. The disc drive of claim 8 wherein the code means comprises:

a code having an algebraic structure that yields a desired free channel distance.

12. The disc drive of claim 11 wherein the code is chosen so the coefficient values in the difference event correspond to a desired free distance of the channel.

* * * * *

UNITED STATES PATENT AND TRADEMARK OFFICE
CERTIFICATE OF CORRECTION

PATENT NO. : 5,790,571
DATED : August 4, 1998
INVENTOR(S) : Varanasi

It is certified that error appears in the above-indentified patent and that said Letters Patent is hereby corrected as shown below:

Column 7, line 21, replace Equation 31 with the following:

$$= 1 + \left( \sum_{i=1}^{n} (a_i + a_{i-1} - a_{i-2} - a_{i-3}) D^i \right) + (a_n - a_{n-1} - a_{n-2}) D^{n+1}$$

$$- (a_n + a_{n-1}) D^{n+2} - a_n D^{n+3}$$

Column 7, line 27, replace Equation 32 with the following:

$$||e_0(D)||^2 = 1 + \left( \sum_{i=1}^{n} (a_i - a_{i-1} - a_{i-2} - a_{i-3})^2 \right) + (a_n - a_{n-1} - a_{n-2})^2$$

$$+ (a_n + a_{n-1})^2 + a_n^2$$

Signed and Sealed this

Twenty-sixth Day of January, 1999

Attest:

*Acting Commissioner of Patents and Trademarks*

*Attesting Officer*